(12) United States Patent
Chari et al.

(10) Patent No.: US 7,123,335 B2
(45) Date of Patent: Oct. 17, 2006

(54) REFLECTIVE LIQUID CRYSTAL DISPLAY WITH INFRARED REFLECTION

(75) Inventors: Krishnan Chari, Fairport, NY (US); Charles M. Rankin, Jr., Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 112 days.

(21) Appl. No.: 10/853,884

(22) Filed: May 25, 2004

(65) Prior Publication Data
US 2005/0264725 A1 Dec. 1, 2005

(51) Int. Cl.
*C09K 19/02* (2006.01)
*G02F 1/1333* (2006.01)

(52) U.S. Cl. .......................................... 349/169; 349/88
(58) Field of Classification Search ................ 349/169; 399/115
See application file for complete search history.

(56) References Cited

U.S. PATENT DOCUMENTS

| | | |
|---|---|---|
| 5,847,798 A | 12/1998 | Yang et al. |
| 6,034,752 A | 3/2000 | Khan et al. |
| 6,061,107 A | 5/2000 | Yang et al. |
| 6,359,673 B1 | 3/2002 | Stephenson |

FOREIGN PATENT DOCUMENTS

| | | |
|---|---|---|
| EP | 1 063 559 A2 | 12/2000 |
| EP | 1 116 771 A2 | 12/2000 |
| EP | 1 324 107 A1 | 12/2002 |

OTHER PUBLICATIONS

U.S. Appl. No. 10/718,900, filed Nov. 21, 2003, Krishnan Chari et al.
T. Kakinuma et al., "Black and White Photo-addressable Electronic Paper Using Encapsulated Cholesteric Liquid Crystal and Organic Photoconductor,"IDW '02, p. 1345 to 1348.

*Primary Examiner*—James A. Dudek
(74) *Attorney, Agent, or Firm*—Chris P. Konkol

(57) ABSTRACT

A display sheet is disclosed comprising, a substrate, first transparent conductors, second conductors and, between first and second conductors, at least one imaging layer comprising a substantial monolayer of isolated domains of liquid-crystal material, dispersed in a continuous matrix, wherein said domains of liquid-crystal material comprises a mixture of at least two populations, a first population comprising a first liquid-crystal material having a first $\lambda_{max}$ within the infrared spectral region and a second population comprising a second liquid-crystal material having a second $\lambda_{max}$ within the visible spectral region. Alternately, the imaging layer can comprise a substantial monolayer of isolated domains of liquid-crystal material comprising a population of domains comprising a liquid-crystal material having a $\lambda_{max}$ between 700 and 800 and having a half-peak width that extends into both the visible spectrum region and the infrared spectral region.

11 Claims, 6 Drawing Sheets

REFLECTIVE LIQUID CRYSTAL DISPLAY WITH INFRARED REFLECTION

FIELD OF THE INVENTION

The present invention relates to a display sheet having a liquid-crystal layer that can change states, a relatively lighter (brighter) state and a relatively darker state, to provide a viewable image, alternatively in either a visible-light and an infrared-light operating spectrum.

BACKGROUND OF THE INVENTION

Bi-stable reflective displays based on PDLC are known. A polymer-dispersed liquid crystal (PDLC) system contains droplets of liquid crystal material dispersed in a polymer matrix. Such systems are known in the art and have been disclosed by Doane et al. (Applied Physics Letters 48, 269, 1986), Doane et al. in U.S. Pat. No. 5,251,048, West et al. (Applied Physics Letters 63, 1471, 1993) and by Stephenson (U.S. Pat. No. 6,359,673). The PDLC may be used to create passive matrix displays on flexible substrates. See also U.S. Pat. No. 6,061,107 to Yang et al., incorporated by reference. Chiral-nematic liquid-crystals, also referred to as cholesteric liquid crystals, have the capacity of maintaining (in a stable state) one of a plurality of given states in the absence of an electric field.

West et al. (Applied Physics Letters 63, 1471 1993) disclose a PDLC based bi-stable reflective display. The device comprises droplets of chiral nematic liquid crystal (CLC) in a polymer binder coated between two transparent electrodes. The CLC material can be switched between a reflecting planar state and a weakly scattering focal conic state by application of voltage pulses of different magnitudes. The planar and focal conic states are both stable at zero applied field. However, West et al. disclose the spectrum of only a single CLC material with peak reflectivity of 564 nm and do not teach methods for obtaining an infrared-light reflecting display. They note that the domain structure of the dispersed system in the focal conic state scatters light uniformly over the visible portion of the spectrum with the back scattered intensity gradually increasing at lower wavelengths, they do not specifically teach methods to improve contrast of the display.

U.S. Pat. No. 6,061,107 to Yang et al. discloses a bi-stable polymer-dispersed cholesteric liquid crystal display having flattened domains between glass plates. The flattened domains are said to have a major axis larger than the cell thickness determined by 5-micron glass fiber spacers. The domains are dispersed in a thermoplastic polymer such as polyvinyl butyral polymer. Multicolor displays in which domains having different cholesteric liquid crystals reflecting different color light, representing different pixels, are disclosed.

Stephenson in U.S. Pat. No. 6,359,673 discloses a PDLC-based bi-stable reflective display. By combining the reflections of droplets of CLC material doped to give reflections either in the blue, green and red part of the spectrum or the blue and yellow part of the spectrum, a neutral appearance in the reflective state is obtained. Stephenson teaches that domains or droplets of liquid crystal in the light-modulating layer are smaller than the thickness of the layer so that multiple domains overlap. Stephenson further teaches that the contrast of the display may be improved by combining multiple overlapping domains comprising right-handed and left-handed chiral-nematics.

T. Kakinuma et al., in "Black and White Photo-addressable Electronic Paper using Encapsulated Cholesteric Liquid Crystal and Organic Photoconductor," *IDW '02*, page 1345 to 1348 discloses a liquid crystal display using a combination of red (pink) and green capsules to create broadband. However, the imaging layer has many overlapping domains (as shown by the enlarged portion of FIG. 1).

U.S. Pat. No. 5,847,798 discloses (particularly in FIG. 7) a liquid crystal cell having multiple stable reflecting states between a colored reflecting state and a light scattering state in order to allow for a substantially white background. Under room light conditions, where light is incident on the cell from all directions, the light reflected from different domains has different colors, including wavelengths that are in the infrared spectral region, because the incident angles θ in different domains are different. As such, the light observed by a human eye is an average of the reflection bands centered at different wavelengths and has a substantially white appearance.

U.S. Pat. No. 6,034,752 to Khan et a. discloses a liquid crystal device in which the liquid crystal material has a pitch length effective to reflect radiation having both the visible and the infrared ranges of the spectrum, either in a single region (single cell) between opposing substrates or in separate regions, for example, in stacked regions in which a first cell reflects red light and a second cell reflects blue light and a third cell reflects green light. The devices described by Khan et al. have a back substrate furthest from the observer that may be painted black or a separate layer may be used to improve contrast. Thus, as shown in the figures, black paint in a background is located on the other side of the ITO electrodes from the layers with the cholesteric material. Example 1 discloses a stacked display, one cell or region reflecting infrared and one cell or region reflecting visible light. Example 2 discloses a composition for a single cell display employing a single liquid crystal material that reflects both visible and infrared radiation. The Examples do not employ domains of liquid crystal in a polymer matrix and the imaging layers are not coated on a flexible substrate.

There are two main methods for fabricating polymer-dispersed liquid crystal devices: emulsion methods and phase-separation methods. Emulsion methods have been described in U.S. Pat. Nos. 4,435,047 and 5,363,482. The liquid crystal is mixed with an aqueous solution containing a binder. The liquid crystal is insoluble in the continuous phase, and an oil-in-water emulsion is formed when the composition is passed through a suitable shearing device, such as a homogenizer. The emulsion is coated on a conductive surface, and the water evaporated. A second conductive surface may then be placed on top of the emulsion layer by lamination, vacuum deposition, or screen-printing to form a device. While the emulsion methods are straightforward to implement, droplet size distributions tend to be broad, resulting in a loss in performance. For cholesteric liquid crystal devices, also referred to herein as CLC devices, this typically means reduced contrast and brightness. Phase separation methods were introduced in an effort to overcome this difficulty.

Phase-separation methods have been outlined in U.S. Pat. No. 4,688,900 and in Drzaic, P. S. in *Liquid Crystal Dispersions* published by World Scientific, Singapore (1995). The liquid crystal and polymer, or precursor to the polymer, are dissolved in a common organic solvent. The composition is then coated on a conductive surface and induced to phase separate by application of ultra-violet (UV) radiation or by the application of heat or by evaporation of the solvent, resulting in droplets of liquid crystal in a solid polymer matrix. A device may then be constructed utilizing this composition.

U.S. Pat. No. 6,423,368 proposes the use of droplets of the liquid crystal material prepared using a limited coalescence process. In this process, the droplet-water interface is stabilized by particulate species, such as colloidal silica. Surface stabilization by particulate species such as colloidal silica is particularly preferred as it can give narrow size distribution and the size of the droplets can be controlled by the concentration of the particulate species employed. The materials prepared via this process are also referred to as Pickering Emulsions and are described more fully by Whitesides and Ross (J. Colloid Interface Sci. 169, 48 (1995)). The uniform droplets may be combined with a suitable binder and coated on a conductive surface to prepare a device. The process provides significant improvement in brightness and contrast over prior art processes. It also overcomes some of the problems associated with photoinitators and UV radiation, which are used in phase-separation techniques.

Commonly assigned, copending U.S. patent application Ser. No. 10/718,900 to Chari et al. shows that the maximum contrast in a bi-stable cholesteric liquid crystal mixture display prepared by the limited coalescence method is obtained when the uniform liquid crystal domains or droplets are coated as substantially a monolayer on the first conductive support. The bi-stable states in these cholesteric liquid crystal mixture displays are the planar reflecting state and the weakly scattering focal conic state. Backscattering of light from the weakly scattering focal conic state increases drastically when there is more than a monolayer of droplets between the conductive surfaces. Chari et al. disclose a liquid crystal display having an imaging layer comprising a mixture of two populations of liquid crystal domains, both populations, however, having a peak wavelength in the visible spectrum.

It would be useful to provide liquid-crystal displays that reflect in both the visible and infrared light ranges with improved contrast. It would be useful for such displays to be fabricated using simple, low-cost processes.

SUMMARY OF THE INVENTION

It is an object of this invention to provide displays that generate both infrared and visible-light reflection and that provides significantly improved contrast and appearance when the liquid crystal in such displays are in the bright state.

It is a further object of the invention to provide a display capable of being viewed alternately in one of two discrete reflection ranges, at high contrast in a visible part of the spectrum and at high contrast in an infrared part of the spectrum.

These objects are achieved in a display sheet comprising in order:
a) an optional substrate for carrying layers of material;
b) first transparent conductors;
c) an imaging layer comprising a substantial monolayer of isolated domains of liquid-crystal material dispersed in a continuous matrix, said liquid-crystal material having a first reflecting state within the infrared light spectrum defining a first operating spectrum and a second weakly scattering state in said first operating spectrum, wherein said domains of liquid-crystal material comprises a liquid-crystal material having a $\lambda_{max}$ above 650 nm, wherein either the same liquid crystal material is used to effectively reflect both infrared and visible light or else the liquid-crystal material reflects effectively only infrared light and, in the same or a second imaging layer, other domains of a second-liquid crystal material have a second reflecting state within the visible light spectrum defining a second operating spectrum and a second weakly scattering state in said second operating spectrum, wherein said first, or first and second, reflecting states and said first, or said first and second, weakly scattering states are capable of being interchanged by an electric field, which states are capable of being maintained as a stable state in an absence of an electric field;
d) second conductors disposed on an opposite side of said imaging layer from said first conductors, wherein either there is an infrared-light blocking layer, between the second conductors and the imaging layer, that blocks substantially all of the infrared light transmitted through the imaging layer, or the second conductors is substantially unreflective of light in the infrared region of the spectrum.

DETAILED DESCRIPTION OF THE PREFERRED EMBODIMENT

Figure 1A:
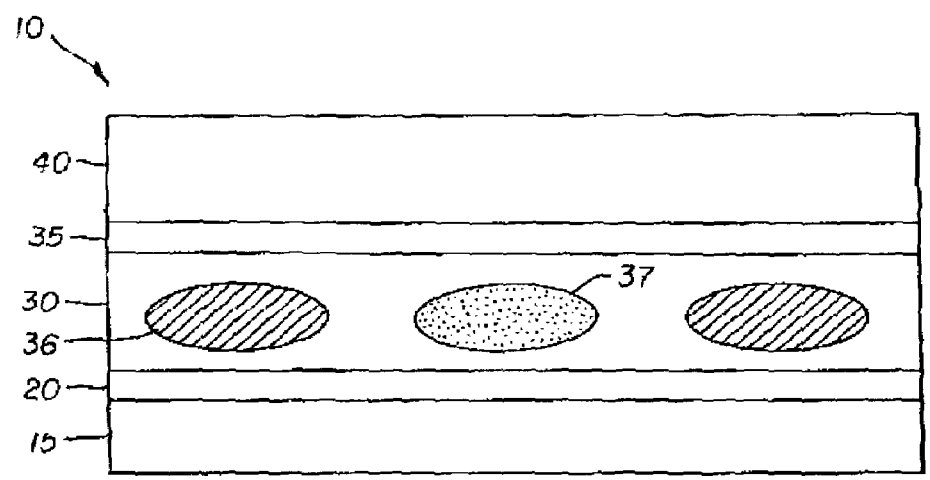
FIG. 1A is a diagram of one embodiment of a display device in accordance with the present invention in which a substantial monolayer of domains in an imaging layer comprises a mixture of two populations of domains comprising, respectively, two differently reflecting liquid-crystal materials.

In one embodiment of the invention a display sheet comprises in order:
 a) a substrate for carrying layers of material;
 b) first transparent conductors;
 c) at least one imaging layer comprising a substantial monolayer of isolated domains of liquid-crystal material, dispersed in a continuous matrix, said liquid-crystal material having a first reflecting state, wherein the first reflecting state is capable of reflecting in either the visible spectral region or the infrared spectral region depending on the incident light (for example, either daylight or other source of substantially visible light, such as a lamp, or a source of substantially infrared-light source such as provided by night-vision goggles), defining either a first or second (infrared or visible) operating spectrum and a second weakly scattering state in said corresponding first or second operating spectrum, wherein said states are capable of being interchanged by an electric field, which states are capable of being maintained as a stable state in an absence of an electric field, wherein said domains of liquid-crystal material comprises a mixture of at least two populations, a first population comprising a first liquid-crystal material having a first $\lambda_{max}$ within the infrared spectral region and a second population comprising a second liquid-crystal material having a second $\lambda_{max}$ within the visible spectral region;
 d) second conductors disposed on an opposite side of said imaging layer from said first conductors, wherein either there is an infrared-light blocking layer, between the second conductors and the imaging layer, that blocks substantially all of the infrared light transmitted through the imaging layer, or the second conductors are substantially unreflective of light in the infrared region of the spectrum.

In another embodiment of the invention, the display sheet is as described above except comprising a first and second imaging layer each comprising a substantial monolayer of isolated domains of liquid-crystal material dispersed in a continuous matrix, and wherein a first liquid-crystal material in the first imaging layer exhibits a first $\lambda_{max}$ within the infrared spectral region and a second liquid-crystal material in the second imaging layer exhibits a second $\lambda_{max}$ within the visible spectral region.

Finally, in a third embodiment of the invention, the display sheet comprises an imaging layer in which there is a substantial monolayer of isolated domains of liquid-crystal material dispersed in a continuous matrix, as described above, except that said domains of liquid-crystal material in the imaging layer comprises a population of domains comprising a liquid-crystal material having a $\lambda_{max}$ between 700 and 800 and having a half-peak width that extends into both the visible spectrum region and the infrared spectral region.

The term "half-peak bandwidth" in referring to a reflection spectrum of a liquid crystal material indicates the spectral region over which absorption exhibited by the liquid crystal material is at least half its reflection at its wavelength of maximum reflection. A liquid crystal material reflects substantially in the infrared region if its reflection half-peak bandwidth is in the infrared range of 700–1200 nm. The term "substantially non-coextensive reflection ranges," as applied to two different liquid crystal materials means that each liquid crystal material exhibits a reflection half-peak band width that extends over at least a 25 nm (preferably 50 nm) spectral region that is not occupied by the half-peak band width of the other liquid crystal material, and preferably they exhibit reflection half-peak band widths that are mutually exclusive.

In a preferred embodiment, the present displays contain chiral-nematic (also referred to as "cholesteric") liquid crystal (CLC) materials. A chiral-nematic liquid-crystal (CLC) material showing Bragg reflection in the visible part of the spectrum is composed of either chiral molecules or, more commonly, a nematic host with a high-twist chiral dopant. The helical twisting power (HTP) of a chiral dopant is a measure of the ability of a chiral dopant to re-organize the directors in a nematic host to achieve Bragg reflection in the visible part of the spectrum. The wavelength of Bragg reflection is dependent on the induced pitch. The latter is inversely proportional to the concentration of chiral dopant.

$$1/p = HTP \times C$$

In the above expression, p is the pitch of the chiral nematic material and C is the concentration of chiral dopant. High twist chiral dopants may be characterized as dopants having HTP values in excess of 100 $(\mu m)^{-1}$ when C is expressed in mole fraction units.

The present invention employs, in a light-modulating layer, a chiral-nematic liquid-crystal composition dispersed in a continuous matrix. Such materials are referred to as "polymer-dispersed liquid crystal" materials or "PDLC" materials. Such materials can be made by a variety of methods. For example, Doane et al. (Applied Physics Letters 48, 269, 1986) disclose a PDLC comprising approximately 0.4 $\mu m$ droplets of nematic liquid crystal 5CB in a polymer binder. A phase separation method is used for preparing the PDLC. A solution containing monomer and liquid crystal is filled in a display cell and the material is then polymerized. Upon polymerization the liquid crystal becomes immiscible and nucleates to form droplets. West et al. (Applied Physics Letters 63, 1471, 1993) disclose a PDLC comprising a chiral nematic mixture in a polymer binder. Once again a phase separation method is used for preparing the PDLC. The liquid-crystal material and polymer (a hydroxy functionalized polymethylmethacrylate) along with a cross-linker for the polymer are dissolved in a common organic solvent toluene and coated on an indium tin oxide (ITO) substrate. A dispersion of the liquid-crystal material in the polymer binder is formed upon evaporation of toluene at high temperature. The phase separation methods of Doane et al. and West et al. require the use of organic solvents that may be objectionable in certain manufacturing environments.

A preferred method of making polymer-dispersed liquid-crystal materials involves emulsions of chiral-nematic materials in aqueous polymer media such as aqueous solutions of polyvinyl alcohol (PVA) or gelatin. Uniform dispersions of liquid-crystal materials may be prepared in these media and coated on suitable substrates. The water is then evaporated and the polymer cross-linked to create a light-modulating layer of an electro-optic device. The use of objectionable organic solvents is thereby eliminated. Such methods are disclosed in commonly assigned, copending U.S. Pat. No. 6,704,073, issued Mar. 9, 2004 to Stephenson, titled "A Method Of Making A Coated Polymer-Dispersed Electro-Optical Fluid And Sheets Formed Thereby," hereby incorporated by reference in its entirety.

In one embodiment, emulsions of the liquid-crystal material in aqueous polymer solutions may be prepared using any of the standard dispersing devices such as homogenizers or emulsifiers that apply high shear to a mixture. Ultrasonic devices may also be used. The oil-water interface may be stabilized by addition of surfactants or particulate species such as colloidal silica. Surface stabilization by particulate species such as colloidal silica is particularly preferred as it can give a narrow size distribution and the size of the droplets can be controlled by the concentration of particulate species employed. The process employing particulate species for stabilization is sometimes referred to in the art as the limited coalescence process as disclosed by Whitesides and Ross (J. Colloid Interface Sci. 169, 48, 1995).

In one embodiment of the invention, shown in FIG. 1A, a display 10 is prepared by applying a substantial monolayer of domains in a chiral-nematic layer 30 of PDLC domains or droplets onto a flexible support or display substrate 15 with a transparent conducting overcoat forming first conductors 20. A second conducting layer forming second conductors 40 is applied over the PDLC or imaging layer. A dark infrared-blocking layer 35 is a light-absorbing layer containing black nanopigment or dispersed carbon black may be coated between the PDLC layer and the second conducting layer to improve contrast of the display. The display may further comprise a plurality of chiral nematic domains 36 and 37 that have been doped to preferentially reflect different portions of the infrared (IR) and visible, respectively, parts of the spectrum. It is preferred that there are no more than two differently doped domains. It is also preferred that these differently doped domains preferentially reflect (i.e. have a peak reflectance or $\lambda_{max}$) in the visible and infrared parts of the spectrum wherein the different parts of the spectrum are defined as follows: visible blue, below 480 nm; visible green, 480 to 560 nm; visible yellow, 560 to 590 nm; visible orange, 590 to 630 nm; visible red, 630 to 720 nm; and IR, above 720 nm. In a display according to this embodiment of the present invention, it is preferred that the peak reflected wavelength of a first material in a first domain population is 400 to 720 preferably 450 to 700 nanometers and the peak reflected wavelength of a second material in a second domain population is 710 to 1100, preferably 750 to 1000 nanometers. Preferably, there is a difference between said first and said second $\lambda_{max}$ of at least 50 nm, preferably in the range of 100 to 150 nm. Preferably the two different populations of liquid-crystal domains have substantially non-coextensive reflection ranges, and preferably they exhibit reflection half-peak bandwidths that are mutually exclusive.

In a preferred embodiment, the imaging layer comprises a mixture of just two different liquid crystal materials, in two different populations of domains, in which the number of domains of each of the two populations of domains is 30 to 70 percent, preferably about 50 percent, of the total number of domains. Alternatively, the imaging layer comprises a mixture of just two different liquid crystal materials, in two different populations of domains, in which the volume of the liquid-crystal material forming each of the two populations of domains is 30 to 70 percent, preferably about 50 percent, of the total volume of domains in the display.

Figure 1B:
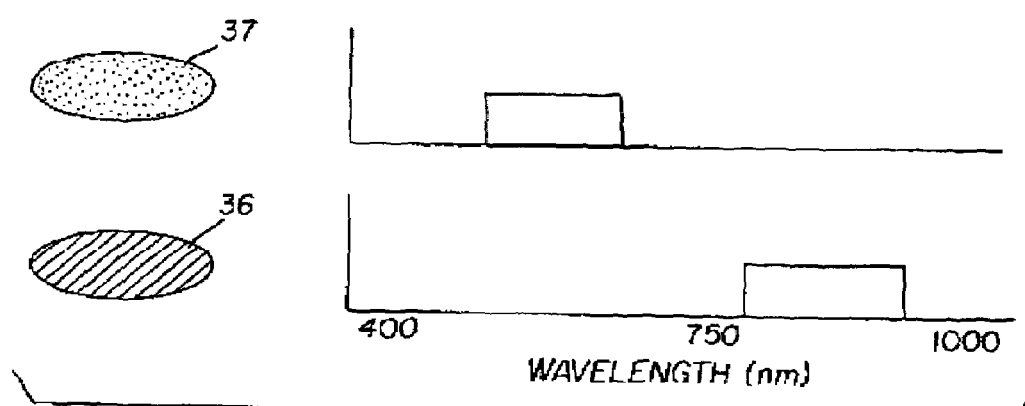
FIG. 1B is a pair of graphs with a common horizontal axis, diagrammatically showing the reflection bands, respectively, of the two domains depicted in FIG. 1A.

FIG. 1B shows a pair of graphs with a common horizontal axis, diagrammatically showing the reflection bands, respectively, of the two domains depicted in FIG. 1A. The peaks are idealized forms of a typically bandwidth more clearly illustrating, however, two different populations of liquid-crystal domains exhibiting reflection bands that are mutually exclusive.

Figure 2A:
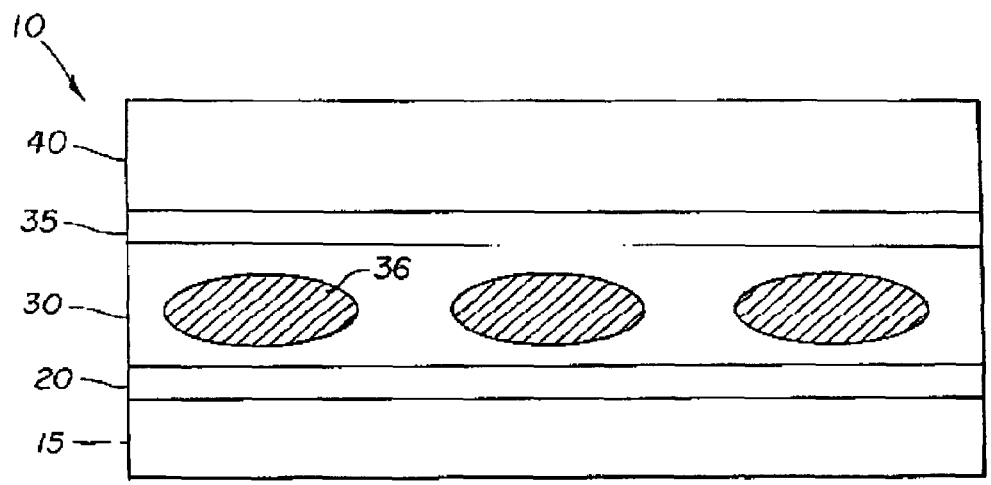
FIG. 2A is a diagram of another embodiment of a display device in accordance with the present invention having a substantial monolayer of domains in an imaging layer, in which the domains all comprise a single liquid-crystal material.

In another embodiment of the invention, shown in FIG. 2A, a display 10 is shown that is prepared by applying a substantial monolayer of domains in a chiral-nematic layer 30 of PDLC domains or droplets onto a flexible support or display substrate 15 with a transparent conducting overcoat forming first conductors 20. A second conducting layer forming second conductors 40 is applied over the PDLC or imaging layer. A dark infrared-blocking layer 35 containing black nanopigment or dispersed carbon black may be coated between the PDLC layer and the second conducting layer to improve contrast of the display. The display may further comprise chiral nematic domains 36 that have been doped to reflect in both the infrared and visible region of the spectrum and in the domains all comprise a single liquid-crystal material, although this material can comprise mixtures of liquid-crystal compounds or mixtures of liquid-crystal compositions.

Figure 2B:
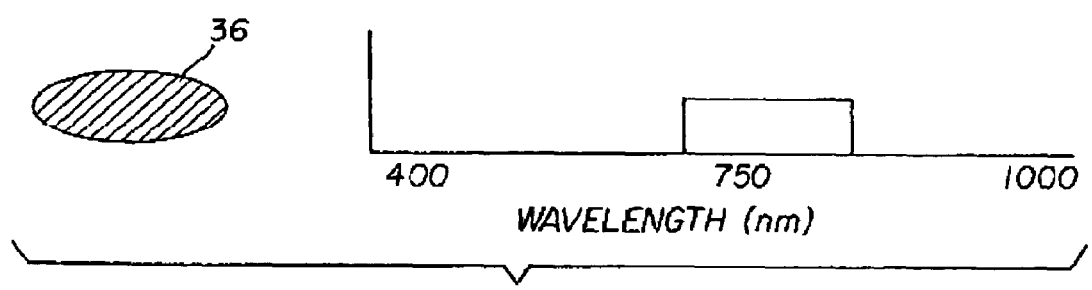
FIG. 2B is a graph diagrammatically showing the reflection band of the domains depicted in FIG. 2A.

FIG. 2B is a graph diagrammatically showing the reflection band of the domains depicted in FIG. 2A which can be seen to extend into both the infrared and visible regions of the light spectrum. Thus, a single liquid crystal material is capable of reflecting portions of both the visible and infrared (IR) parts of the spectrum. In this embodiment, the peak reflected wavelength of the liquid crystal material is in the range of between 650 and 900, preferably 680 to 800, more preferably about 680 to 780 nanometers.

Figure 3A:
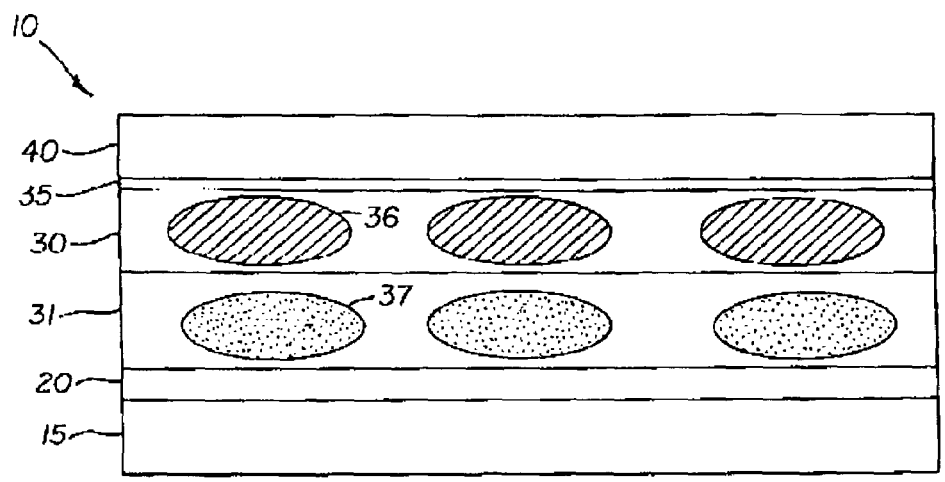
FIG. 3A is a diagram of a display device in accordance with the present invention having first and second stacked imaging layers each comprising a substantial monolayer of domains of, respectively, first and second differently reflecting liquid-crystal materials.

In yet another embodiment of the invention, shown in FIG. 3A, a display 10 is prepared by two stacked layers each having a substantial monolayer of domains in first and second imaging layers 31 and 30 reflecting, respectively in the infrared and visible light regions and each containing PDLC domains or droplets. Such imaging layers are coated over the flexible support or display substrate 15 with a transparent conducting overcoat forming first conductors 20. A second conducting layer forming second conductors 40 is applied over the PDLC or imaging layer. A dark infrared-blocking layer 35 containing black nanopigment or dispersed carbon black may be coated between the PDLC layer and the second conducting layer to improve contrast of the display. The display may further comprise a plurality of chiral nematic domains 36 and 37, respectively, in imaging layers 30 and 31, which have been doped to preferentially reflect different portions of the visible and infrared (IR) parts of the spectrum. It is preferred that there are no more than two differently doped domains in the imaging layer having domains 31 that reflect in the visible spectral region.

In one embodiment, the second imaging layer in FIG. 3A contains a two population of domains with different lambda max in the visible, preferably one population of domains that reflects red and one population of domains that reflects green, blue, or cyan, most preferably green. Thus, in this embodiment, the device of FIG. 3A can comprise three populations of domains, a first population in the first imaging layer, reflecting infrared, and a second and third population in the second imaging layer, reflecting different colors of visible light.

Figure 3B:
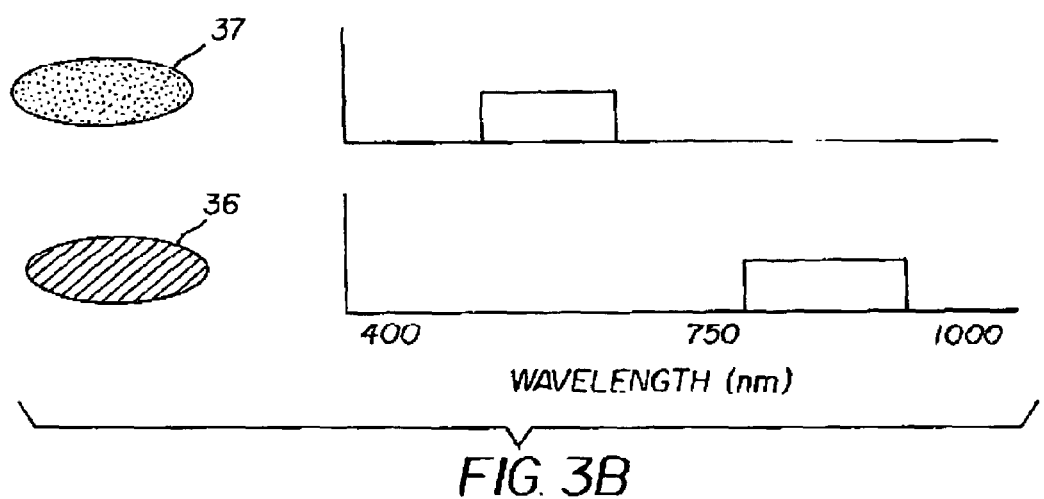
FIG. 3B is a pair of graphs having a common horizontal axis, diagrammatically showing the reflection bands, respectively, of the domains depicted in FIG. 3A.

FIG. 3B is a pair of graphs having a common horizontal axis, diagrammatically showing the reflection bands, respectively, of the domains depicted in FIG. 3A.

Regarding the first and third type of embodiments described above (in which there are two populations of domains in either one or two imaging layers, the monodispersity of the domains in the imaging layer or layers are preferably such that the coefficient of variation (which is the ratio of standard deviation to arithmetic mean) for the size distribution of the isolated domains in the layer is preferably less than 0.3, more preferably less than 0.25, around a mean diameter of 12 microns and an aspect ratio of about 3:1.

Also, the first liquid-crystal material preferably has a peak reflected wavelength in the range of 710 to 1100, more preferably 750 to 1000 nanometers and the said second liquid-crystal material preferably has a peak reflected wavelength in the range of 400 to 720, more preferably 450 to 700 nanometers. Also, the difference between the first and said second $\lambda_{max}$ is preferably at least 50 nm, more preferably in the range of 100 to 150 nm. Also, it is preferred that the said second liquid-crystal material reflects green having $\lambda_{max}$ in a range 570 to 580 nm.

The liquid crystalline composition employed in the present invention is a chiral-nematic material. Preferably, the material comprises one or more liquid-crystal compounds forming a chiral-nematic material. Preferably, the liquid crystal mixture comprises 2 to 25 compounds, preferably 3 to 15 compounds. Particularly suitable liquid crystalline compositions are those in which the achiral liquid crystalline compounds comprise cyclic compounds, for example biphenyls, as will be appreciated by the skilled artisan. Suitable liquid crystalline compounds are well known to the skilled artisan.

Examples of nematic hosts are mixtures containing 5CB or MBBA.

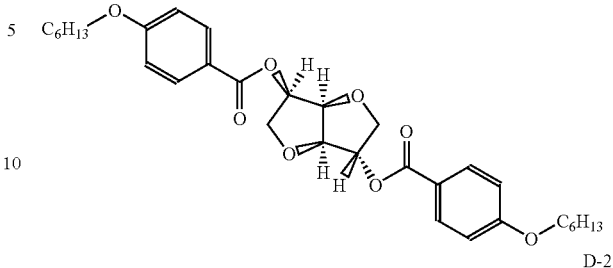

(D-1)

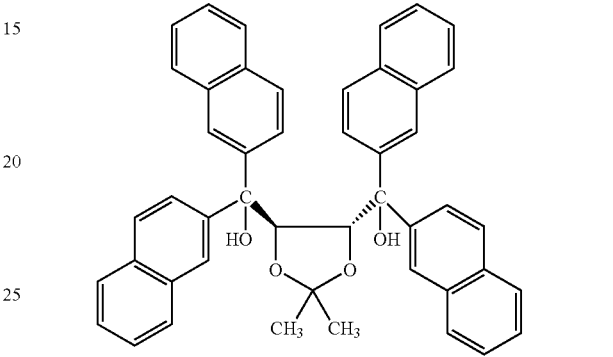

D-2

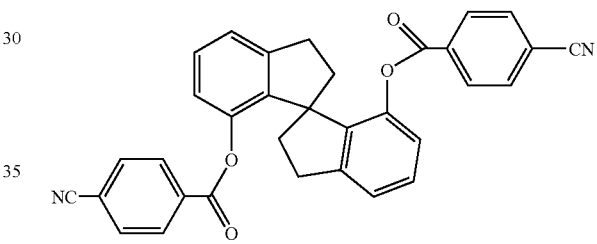

D-3

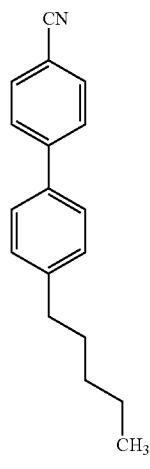

5CB
40817-08-1
4-Cyano-4'-pentylbiphenyl

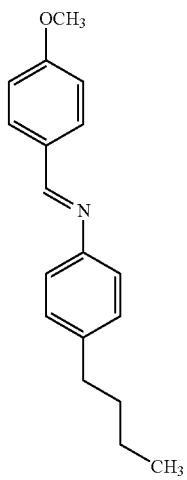

MBBA
CAS #97402-82-9
(E)-N-(4-Methoxybenzylidene)-
4-butylaniline

Examples of high twist chiral dopants that can be employed to provide the desired reflectance of the liquid-crystal materials include, for example, isosorbide esters (1) as disclosed in U.S. Pat. No. 6,217,792, taddols (2) as disclosed in U.S. Pat. No. 6,099,751 and spirobiindanes (3) as disclosed in U.S. patent application Ser. No. 10/651,692 by T. Welter et al., filed Aug. 29, 2003, titled "Chiral Compounds And Compositions Containing The Same," hereby incorporated by reference.

One or more chiral dopants can be used cumulatively in an effective amount. Suitably, a dopant can be used in the amount of 0.1 to 20 weight percent, based on the total weight of the liquid crystal composition, preferably 0.5 to 10 weight percent, more preferably 1 to 6 weight percent. As mentioned above, the amount of chiral dopant necessary to obtain the desired pitch is employed.

The liquid crystalline compositions can advantageously be used for coating substrates. Examples of suitable substrates are metal surfaces, plastic surfaces, glass or ceramic surfaces or films. To this end, the compositions are, for example, applied to a substrate, preferably a polymeric film, if desired by knife coating or other physical influences. One embodiment of a display in which domains of a cholesteric liquid crystal composition are dispersed in a polymeric matrix, disposed between electrodes is, for example, disclosed in U.S. Pat. No. 6,236,442 to Stephenson et al. and U.S. Pat. No. 5,695,682 issued Dec. 9, 1997 to Doane et al., the disclosures of which are incorporated by reference.

In one embodiment, a display comprises: (a) a flexible transparent support; (b) a patterned first conductor layer comprising transparent first conductors; (c) a patterned second conductor layer comprising second optionally transparent conductors; and (d) at least one imaging layer comprising domains of polymer-dispersed chiral nematic (cholesteric) liquid crystal material dispersed in a continuous polymeric matrix, the imaging layer disposed between the first and second conductors. Such chiral nematic liquid crystal material can exhibit two contrasting stable states, a reflecting planar state and a weakly scattering focal conic state, which two states can be switched from one to the other by application of suitable voltages.

The inventors have determined that the contrast of the display is degraded if there is more than a substantial monolayer of CLC domains. The term "substantial monolayer" is defined by the Applicants to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display. In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

The amount of material needed for a monolayer can be accurately determined by calculation based on individual domain size, assuming a fully closed packed arrangement of domains. (In practice, there may be imperfections in which gaps occur and some unevenness due to overlapping droplets or domains.) On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and infrared features may be obtained by appropriate choice of differently doped domains based on the geometry of the coated droplet and the Bragg reflection condition.

As indicated above, the display device or display sheet can simply have a single imaging layer of liquid crystal material along a line perpendicular to the face of the display, preferably a single layer coated on a flexible substrate. Alternately, vertically stacked imaging layers between opposing substrates can be used.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 4 to 30 microns. The imaging layer preferably has a thickness of 10 to 150 microns when first coated and 5 to 20 microns when dried.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

Returning to FIG. 1A, this preferred embodiment is now described in greater detail. A sheet designated as display 10 includes a display substrate 15 that is a thin transparent polymeric material. One such material is Kodak Estar® film base formed of polyester plastic that has a thickness of between 20 and 200 micrometers. For example, the display substrate 15 can be a 125-micrometer thick sheet of polyester film base. Other polymers, such as transparent polycarbonate, can also be used.

One or more first conductors 20 are formed on display substrate 15 that can be tin-oxide, indium-tin-oxide (ITO), or polythiophene, with ITO being the preferred material. Typically the material of first conductors 20 is sputtered or coated as a layer over display substrate 15 and has a resistance of less than 1000 ohms per square. First conductors 20 can be formed in a conductive layer, for example, by conventional lithographic or laser etching means. Transparent first conductors 20 can also be formed by printing a transparent organic conductor such as PEDT/PSS, PEDOT/PSS polymer, which materials are sold as Baytron® P by Bayer AG Electronic Chemicals.

Chiral-nematic liquid-crystal layer 30 overlaying first conductors 20 can contain chiral-nematic liquid-crystal material such as those disclosed in U.S. Pat. No. 5,695,682 issued Dec. 9, 1997 to Doane et al., the disclosure of which is incorporated by reference. Such materials are made using highly anisotropic nematic liquid-crystal mixtures and adding a chiral doping agent to provide helical twist, in the planes of the liquid crystal, to the point that interference patterns are created that reflect incident light. Application of electrical fields of various intensity and duration can be employed to drive a chiral-nematic (cholesteric) liquid-crystal material into a reflective state, into a weakly scattering state, or into an intermediate state. These materials have the advantage of having first and second optical states that are both stable in the absence of an electrical field. The materials can maintain a given optical state indefinitely after the field is removed. Chiral-nematic liquid-crystal materials can be formed using a two-component system such as MDA-00-1444 (undoped nematic) and MDA-00-4042 (nematic with high chiral dopant concentrations) available from E.M. Industries of Hawthorne, N.Y.

In this embodiment, two chiral nematic compositions with center wavelengths of reflection at 550 (green) and 850 nm (infrared) are prepared by adding an appropriate amount of a high-twist chiral dopant to the nematic host mixture BL087 obtained from Merck, Darmstadt, Germany. Such dispersions of the chiral nematic compositions can be prepared by a limited coalescence procedure as described in Example 1 below.

In a preferred embodiment, as mentioned above, chiral-nematic liquid-crystal layer 30 is a chiral-nematic liquid-crystal material dispersed in gelatin, preferably deionized photographic-grade gelatin. For example, the liquid-crystal material is mixed at 8% chiral-nematic liquid crystal in a 5% gelatin aqueous solution. The mixture is dispersed to create an emulsion having 8–10 micrometer diameter domains of the liquid crystal in aqueous suspension. The domains can be formed using the limited coalescence technique described in copending U.S. Pat. No. 6,423,368 issued Jul. 23, 2002 to Stephenson et al. The emulsion can be coated over first conductors 20 on a polyester display substrate 15 and dried to provide an approximately 9-micrometer thick polymer dispersed chiral-nematic coating. Other organic binders such as polyvinyl alcohol (PVA) or polyethylene oxide (PEO) can be used in place of the gelatin. Such emulsions are machine coatable using coating equipment of the type employed in the manufacture of photographic films. A gel sublayer can be applied over first conductors 20 prior to applying chiral-nematic layer 30 as disclosed in U.S. Pat. No. 6,423,368.

A chiral-nematic liquid-crystal material can exhibit, respectively, a planar and focal-conic state. In one embodiment, after a high voltage field has been applied and quickly switched to zero potential, the liquid-crystal molecules align as planar liquid crystals which reflect portions of incident light as planar reflective light. The chiral dopant concentration defines the wavelength of peak reflection. The bandwidth around the peak reflection is proportional to the optical birefringence of the nematic liquid crystal. An application of a lower voltage field causes molecules of the chiral-nematic liquid-crystal material to break into tilted cells known as focal conic liquid crystals. The orientation of the focal-conic material is weakly scattering rather than reflective. Changes in the low-voltage time duration permits molecules to assume orientations between reflective planar state and the light scattering focal conic state.

In the fully evolved focal-conic state, the chiral-nematic liquid crystal is light scattering and incident light is forward scattered and can be absorbed by a dark infrared-blocking layer to create the appearance of a black (or blackish-dark) image area. Progressive evolution from a planar to focal-conic state causes a viewer to perceive a bright planar reflective light that transitions to black as the chiral-nematic material changes from reflective planar state to a fully evolved light-scattering focal-conic state. When the field is removed, chiral-nematic liquid-crystal layer maintains a given optical state indefinitely. The states are more fully discussed in U.S. Pat. No. 5,437,811 issued Aug. 1, 1995 to Doane et al.

Figure 4:
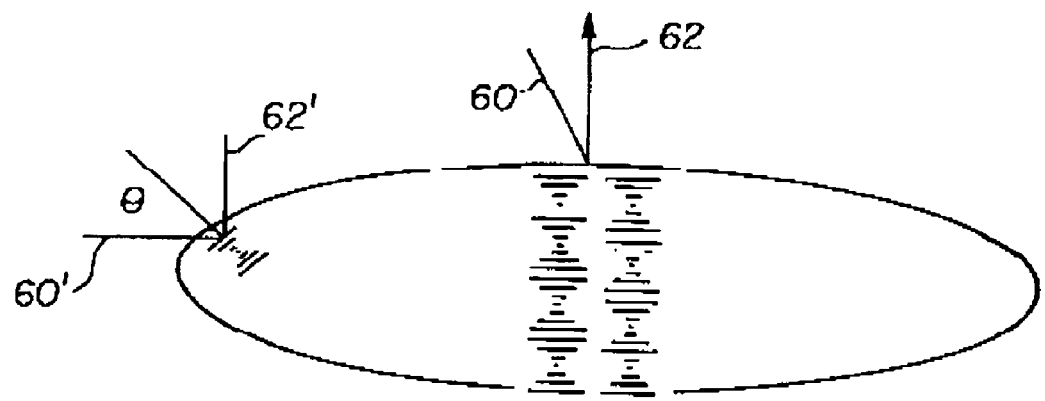
FIG. 4 is a sectional view of a domain containing chiral-nematic liquid material in the planar or reflecting state.

FIG. 4 is a sectional view of a domain containing chiral-nematic liquid-crystal material in the planar state. Chiral-nematic liquid-crystal material anchors against an arcuate surface. Incident light 60 and 60' can strike the domain, respectively, at a relatively perpendicular angle or at an oblique angle resulting in reflected light 62 and 62', respectively. Light striking chiral-nematic material at an oblique angle reflects light at a shorter wavelength. The peak reflected wavelength and bandwidth of light is a function of both the chiral-nematic liquid-crystal material properties and domain size and shape.

Returning again to FIG. 1A, the dark infrared-blocking layer 35, overlaying the chiral-nematic liquid-crystal layer 30 is preferably composed of pigments that are milled below 1 micrometer to form "nano-pigments" in a binder. Such pigments are very effective in absorbing wavelengths of light in very thin (sub-micrometer) layers. Such pigments can be selected to be electrically inert to prevent degradation and interference with electrical display fields applied to display 10. Such pigments are disclosed in copending U.S. patent application Ser. No. 10/222,396 filed Aug. 16, 2002, hereby incorporated by reference. The filter layer can comprise two or more differently hued pigments. Dark infrared-blocking layer 35 should be as thin as possible to minimize drive voltage while providing an acceptable degree of light absorption. Pigments are extremely efficient light absorbers and ideally suited for this purpose. In the preferred embodiment, chiral-nematic liquid-crystal layer 30 is between 4 and 10 micrometers thick. The state changing field for chiral-nematic liquid-crystal materials is typically 10 volts per micrometer coating thickness. Because dark infrared-blocking layer 35, in the preferred embodiment, is disposed between the two field-carrying conductors, the layer should be significantly thinner than the chiral-nematic liquid-crystal layer 30. In practice, dark infrared-blocking layer 35 should be less than about 1 micrometers, preferably 0.5 micrometers or less in thickness. The amount of binder in dark infrared-blocking layer 35 should also be low to minimize any increase in drive voltage. A gelatin binder at a 1:1 ratio with the pigment can provide a layer with good bond strength to subsequently applied layers and minimize increases in drive voltage.

The dark infrared-blocking layer 35 provides a high-contrast dark image area in the focal conic state relative to planar reflective light. The dark infrared-blocking layer 35 can be coated simultaneously with the deposition of chiral-nematic liquid-crystal layer 30 or in a separate step. In a preferred embodiment, multi-layer coating equipment, such as those used in making photographic imaging elements, provides chiral-nematic liquid-crystal layer 30 and dark infrared-blocking layer 35 as two co-deposited layers. Dark infrared-blocking layer 35 is significantly thinner than chiral-nematic layer 30 and, therefore, as mentioned above, has minimal effect on the electrical field strength required to change the state of the chiral-nematic liquid-crystal material in the manufactured display.

Continuing to refer to the embodiment of FIG. 1A, second conductors 40 overlay the dark infrared-blocking layer 35. On the absence of an infrared-blocking layer, either in a dark layer for forming background contrast or in a separate layer, the second conductor should be made of an infrared-blocking material (non-reflecting, preferably non-metallic) such as graphitic carbon. Second conductors 40 have sufficient conductivity to induce an electric field across chiral-nematic liquid-crystal layer 30, which field is strong enough to change the optical state of the polymeric-dispersed liquid-crystal material. Second conductors 40 in this embodiment are formed, for example, by vacuum deposition of conductive material such as aluminum, silver, chrome, or nickel. In the case of vacuum coated second conductors 40, aluminum or silver provides very high conductivity. The layer of conductive material can be patterned using well known techniques of photolithography, laser etching, or by application through a mask.

In another embodiment, second conductors 40 are formed by screen printing a reflective and conductive formulation such as UVAG10 silver ink from Allied Chemical (Minneapolis, Minn.). Such screen printable conductive materials comprise finely divided silver in an ultraviolet curable resin. After printing, when the material is exposed to ultraviolet radiation greater than 0.40 Joules/cm$^2$, the resin will polymerize in about two seconds to form a durable surface. Screen printing is preferred to minimize the cost of manufacturing the display. Providing a sufficient amount of polymer to pigment in dark infrared-blocking layer 35 creates a printable surface on second conductors 40. Alternatively, second conductors 40 can be formed by screen printing thermally cured silver-bearing resins. An example of such a material is UVAG10 silver ink from Allied Chemical. The first and second conductors can be patterned to produce an addressable matrix. In the absence of an infrared blocking layer, the preferred material for the second conductors is based on carbon graphitic ink.

The following examples illustrate the invention.

EXAMPLE 1

This example illustrates how to make a dual visible and infrared reflecting display according to the present invention. Chiral nematic compositions with center wavelengths of reflection at 550 (green) and 850 nm (infrared) were prepared by adding the appropriate amount of a high-twist chiral dopant to the nematic host mixture BL087 obtained from Merck, Darmstadt, Germany.

Dispersions of the chiral nematic compositions were prepared using the following limited coalescence procedure.

To 200 grams of distilled water was added 3.3 grams of Ludox® colloidal silica suspension and 6.9 grams of a 10% w/w aqueous solution of a copolymer of methylaminoethanol and adipic acid. To this was added 90 grams of any one of the chiral-nematic compositions prepared above (i.e. reflection wavelength 550 nm or 850 nm). The mixture was stirred using a Silverson® mixer at 5000 rpm. It was then passed twice through a Microfluidizer® at 3000 psi. Two hundred and eighty grams of the resulting dispersion was mixed with 770 grams of an aqueous solution containing 6.8% w/w Type IV gelatin at 50° C. The dispersion (8% w/w LC material and 5% w/w gelatin) was stored in a refrigerator until further use.

Microscopic examination showed that the dispersion consisted of uniform 10 μm droplets of the LC material in an aqueous gelatin medium.

Dispersions of the green reflecting LC material (550 nm) and the infrared (IR) reflecting CLC material (850 nm) were combined to create a coating composition consisting of 50% by weight of domains of green LC material and 50% by weight of domains of IR LC material with an overall composition of 8% LC material and 5% gelatin.

The coating composition was then knife x-hopper coated at 61.4 cm³/m² (5.71 cc/ft²) at a rate of 2.4 m/min (8 feet per minute). To aid the coating process, a small amount of surfactant (a mixture of the sodium salts of di-isopropyl and tri-isopropyl naphthalene sulfonate, commercially available from DuPont, Inc. in Wilmington, Del. as ALKANOL XC) was added. The support thickness was 0.12 mm (4.7 mil) PET with Indium Tin Oxide sputter coated on top of it. The sheet resistance of the support was 300 ohms/square. The material was chill set on a coating block at a temperature of approximately 15 degrees Celsius.

After chill setting, the sample was allowed to air dry under ambient laboratory conditions for 24 hours. The sample then had a conductive patch screen printed on top of it to act as the second electrode. In the preferred embodiment, the second conductor is printed with conductive ink such as ELECTRODAG 423SS screen-printable electrical conductive material from Acheson Industries (Port Huron, Mich.). Such printed materials are finely divided graphite particles in a thermoplastic resin. The information displayed on the coating could be easily viewed in daylight or under ordinary room lights. The information was also readable in complete darkness using night-vision goggles such as MODEL 800 commercially available from Night Vision Equipment Company (Allentown, Pa.), which are equipped with a built-in infrared illuminator that illuminates at 850 nm.

A second control device was fabricated in the same manner as above but using UV-curable silver ink from Allied Chemical in place of the carbon conductive ink. In this case the information could be read in daylight or under ordinary room lights but not in darkness using night vision goggles.

EXAMPLE 2

This example, applicable to all three of the above-described embodiments, illustrates the influence of laydown of the liquid-crystal ("LC") material on backscattering from the focal conic state and contrast of the display.

For 10 μm droplets, full monolayer coverage can be expected at a laydown of about 6.5 g/m² (600 mg/ft²) of the liquid-crystal composition or a wet coverage of 80.7 cm³/m² (7.5 cm³/ft²) if the coating composition is made up of 8% the liquid-crystal material and 5% gelatin by weight. An amount in slight excess of this will still constitute a substantial monolayer, well below a bi-layer of domains.

Figure 5:
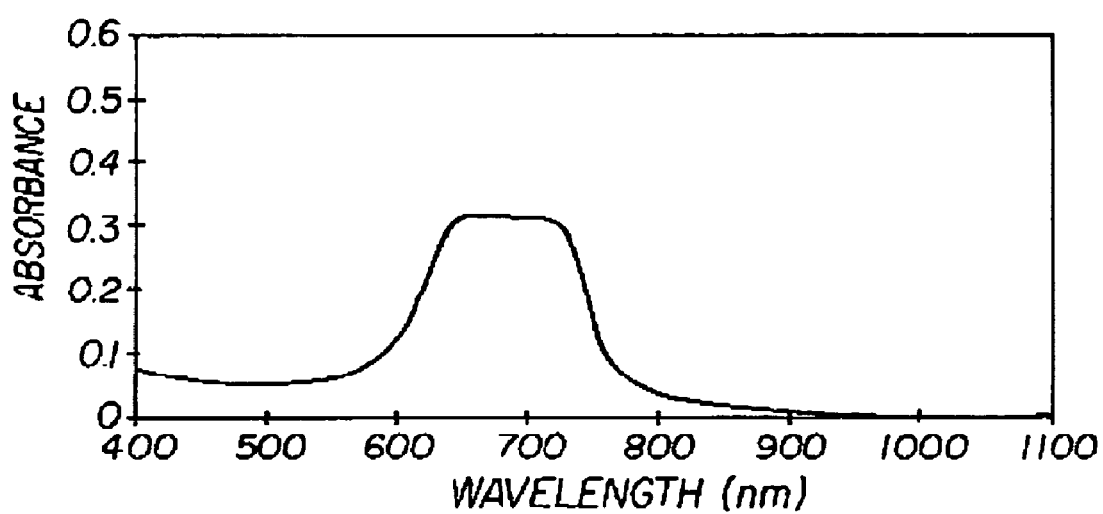
FIG. 5 is a plot of the "absorbance" versus wavelength for a red-reflecting chiral nematic composition as described in Example 2.

Chiral nematic compositions with center wavelengths of reflection at 470 and 690 nm were prepared by adding the appropriate amount of a high-twist chiral dopant to the nematic host mixture BL087 obtained from Merck, Darmstadt, Germany. The compositions were evaluated by placing a small amount on a glass slide with a cover slip. The "absorption" spectra were then obtained on a standard spectrophotometer. The spectrum of the 690 nm sample is shown in FIG. 5. It should be noted that there is no light absorption by these materials. At the reflecting wavelength, theoretically half the incident light is reflected and the other half is transmitted. Therefore, the spectrophotometer should measure an "absorbance" of 0.3 where "absorbance" is simply $\log_{10}(1/T)$; T being the transmittance of the sample. Since half the light is transmitted, T should theoretically be 0.5 and $\log_{10}(2)$~0.3. FIG. 5 shows that the maximum "absorbance" of the sample is indeed close to 0.3.

Dispersions of the chiral nematic compositions were prepared as follows. To 200 grams of distilled water was added 3.3 grams of Ludox® colloidal silica suspension and 6.9 grams of a 10% w/w aqueous solution of a copolymer of methylaminoethanol and adipic acid. To this was added 90 grams of any one of the chiral-nematic compositions prepared above (i.e. reflection wavelength 470 nm or 690 nm). The mixture was stirred using a Silverson ®mixer at 5000 rpm. It was then passed twice through a Microfluidizer® at 3000 psi. Two hundred and eighty grams of the resulting dispersion was mixed with 770 grams of an aqueous solution containing 6.8% w/w Type IV gelatin at 50° C. The dispersion (8% w/w LC material and 5% w/w gelatin) was stored in a refrigerator until further use. Microscopic examination showed that the dispersion consisted of uniform 10 μm droplets of the LC material in an aqueous gelatin medium.

Dispersions of the blue reflecting LC material (470 nm) and the red reflecting CLC material (690 nm) were combined to create a coating composition consisting of 30% by weight blue LC material and 70% by weight red LC material with an overall composition of 8% LC material and 5% gelatin. The coating composition was then knife coated onto a flexible polyethylene terephthalate (PET) surface with an 800 Å thick sputter coated indium tin oxide (ITO) layer to give different coverages of the LC material. The coatings were allowed to dry. A black nano-pigment layer was then spread over the LC layer followed by patches of conducting ink. Coatings containing wet coverages of 53.8, 129.2 and 161.5 cm³/m² (5, 12 and 15 cm³/ft²) for the LC layer were obtained in this manner.

Figure 6:
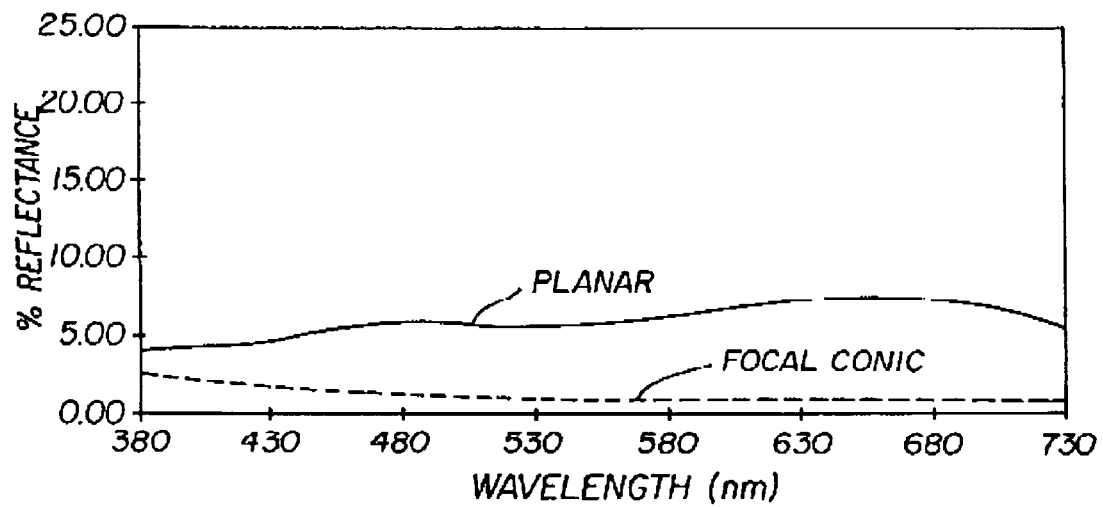
FIG. 6 is a plot showing the percent reflectance in the planar (solid line) and weakly scattering focal conic state (dotted line), respectively, for the polymer dispersed liquid crystal display of Example 2 in which there are two different groups of liquid crystal domains containing, respectively, a blue-reflecting and a red-reflecting material.

Voltage pulses were applied to the coatings to switch them to the planar and focal conic states. The applied voltage had a frequency of 1 kHz. For the 53.8 cm³/m² (5 cm³/ft²) sample, 80 volts was needed to switch to the planar texture and 40 volts to switch to the focal conic texture. The reflectivity in both states was recorded as a function of wavelength using a Spectrolino SpectoScan® reflectance spectrometer. The results are shown in FIG. 6. The full line and dashed line show percent reflectance in the planar reflective state and the weakly scattering focal conic state respectively.

Figure 7:
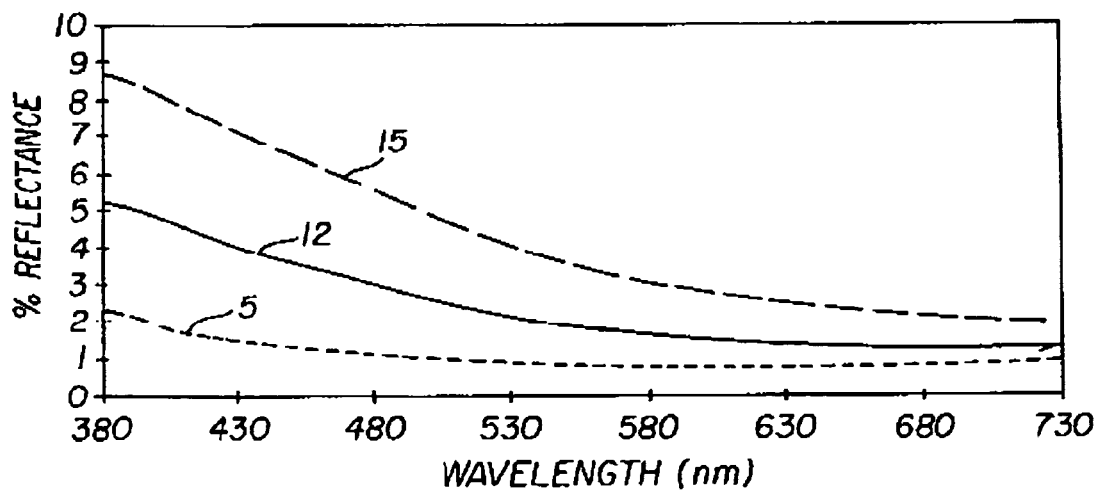
FIG. 7 is a plot showing the percent reflectance as a function of wavelength in the focal conic state for three different laydowns of chiral-nematic liquid-crystal material, showing an increase in the backscattering with higher laydowns beyond the monolayer.

FIG. 7 shows percent reflectance as a function of wavelength for three different laydowns of the LC material. The full line, dashed line and dotted line correspond to coverages of 53.8, 129.2, and 161.5 cm³/m² (5, 12 and 15 cm³/ft²) respectively. It is clear that the level of back scattering in the focal conic state increases significantly as the laydown is increased beyond monolayer coverage. Since the focal conic texture constitutes the dark state of the display, this has an adverse effect on the contrast ratio and the overall quality of the display. One may define the contrast ratio as the ratio of the reflectance in the bright (planar) state to the dark (focal conic) state at a wavelength of 570 nm. The contrast ratios corresponding to laydowns of 53.8, 129.2, and 161.5 cm$^3$/m$^2$ (5, 12 and 15 cm$^3$/ft$^2$) are 7.7, 6.4, and 3.5 respectively. It is clear that the contrast ratio is much lower at laydowns greater than a monolayer of the LC droplets because of a significant increase in backscattering in the focal conic state.

EXAMPLE 3

This example illustrates, for use in the display of embodiment of FIG. 3A, comprising stacked imaging layers, the fabrication of an imaging layer for the visible operating spectrum that is broadband for improved (high) contrast ratio in that layer. Consumers find such displays visually pleasing because of their more neutral appearance.

Figure 8:
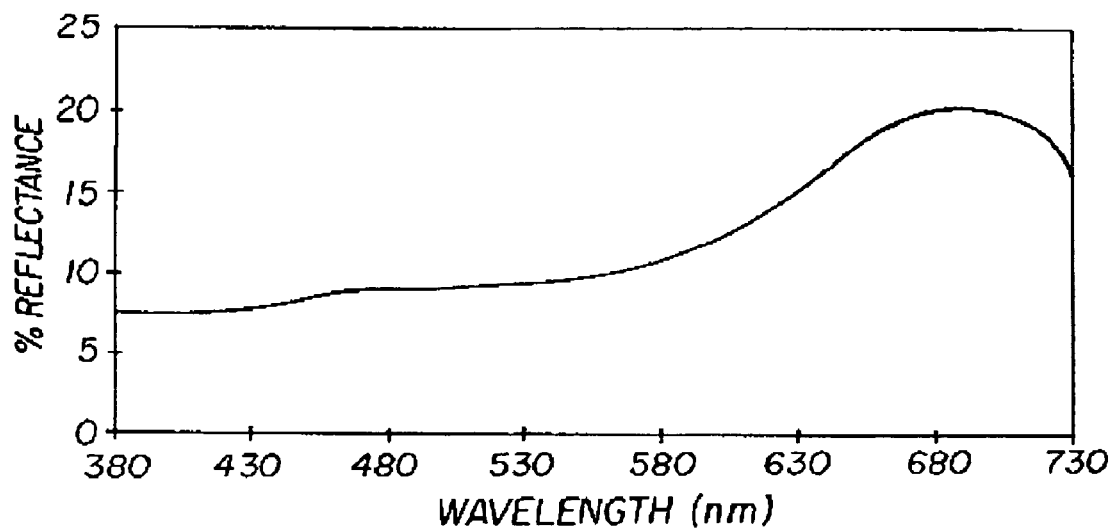
FIG. 8 shows the reflectance spectrum of the material of FIG. 5 when it is in the form of an elliptically shaped coated droplet.

It should be noted that the spectrum of the LC material in the planar state in a coated droplet is much broader than the spectrum of the material between glass slides. For example, the red reflecting LC material shown in FIG. 5 has a spectrum as shown in FIG. 8 when it is in a coated droplet because of the elliptical shape of the droplet. As shown previously in FIG. 4, measurable reflectance for a coated droplet may be obtained in this case at lower wavelengths because of the Bragg reflection condition at the curved boundary of a droplet. The wavelength of maximum reflection $\lambda_{max}$ is given by $\lambda_{max}$=np cos θ where n is the average refractive index of the LC material and p is its pitch. Note that cos θ decreases as θ increases. In other words, a red reflecting LC composition may actually reflect a bit of the blue, green, yellow, and orange portions of the spectrum when viewed on-axis. Visually pleasing infrared displays with high contrast and good viewing angle dependence may be obtained by combining red or infrared (IR) reflecting droplets with green or yellow reflecting droplets.

A green reflecting LC composition was prepared by adding the required amount of a high twist chiral dopant to the BL087 nematic host mixture. The concentration of dopant was adjusted to give a center wavelength of reflection of 550 nm. A dispersion of this LC material was prepared in the same manner as described previously in Example 2 for the blue and red materials.

Dispersions of the green reflecting LC material (550 nm) and the red reflecting LC material (690 nm) were combined to create a coating composition consisting of 50% by weight green LC material and 50% by weight red LC material with an overall composition of 8% LC material and 5% gelatin. The coating composition was then knife coated onto a flexible polyethylene terephthalate (PET) surface with an 240 Å thick sputter coated indium tin oxide (ITO) layer at a wet laydown of 86.1 cm$^3$/m$^2$ (8 cm$^3$/ft$^2$) which is slightly above the calculated amount corresponding to exactly full monolayer coverage. The coatings were allowed to dry. A black nano-pigment infrared-blocking layer was then spread over the LC layer followed by patches of conducting ink. A second coating was prepared using the chiral nematic mixture BL118 from Merck at 61.4 cm$^3$/m$^2$ (5.7 cm$^3$/ft$^2$).

Figure 9:
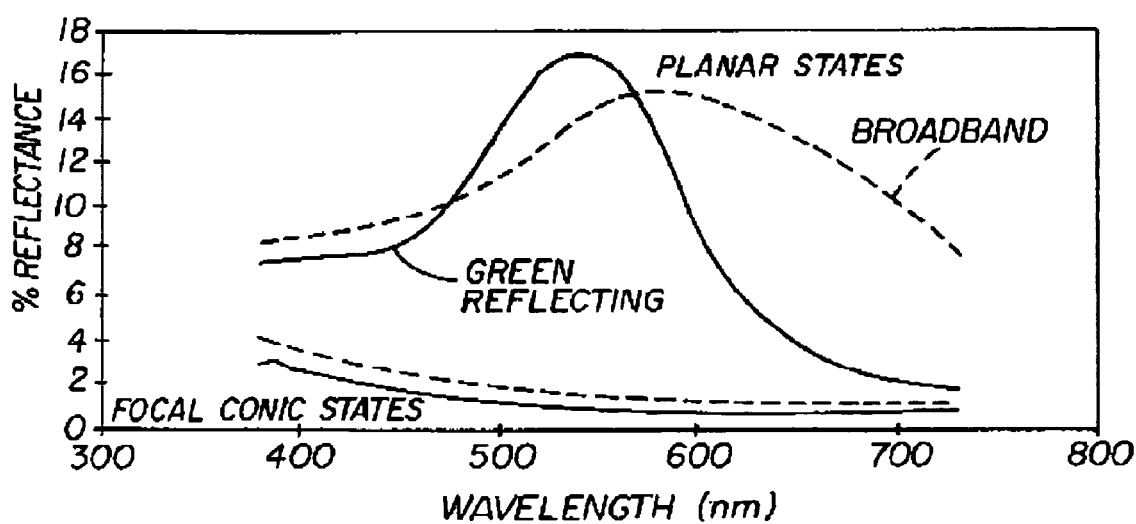
FIG. 9 is a plot of the percent reflectance in the planar reflective states and the weakly scattering focal conic states showing increased broadband with little increase in back-scattering for a display according to Example 3 below having a combination of green and red domains, compared to a display having a single green-reflecting domain.

Voltage pulses were applied to the coatings to switch them to the planar and focal conic states. The applied voltage had a frequency of 1 kHz. For both samples, 120 volts was needed to switch to the planar texture and 60 volts to switch to the focal conic texture. The reflectivity in both states was recorded as a function of wavelength using a Spectrolino SpectoScan® reflectance spectrometer. The results are shown in FIG. 9. Inspection of FIG. 9 shows that broadband features can be obtained with little increase in backscattering in the focal conic state and therefore excellent contrast between the bright and dark states of the display for the visible operating spectrum used in conjunction with the IR operating spectrum in a stacked embodiment such as in FIG. 3A. It should also be pointed out that an infrared display using a combination of green and red domains also provides superior contrast for off-axis viewing. A composition such as BL118 that reflects green, will shift to blue as the viewer moves off-axis in which case contrast with respect to a black dark state will be poor. However, the red component of our infrared display will shift to orange or yellow-green as the viewer moves off-axis thereby maintaining good contrast versus the dark state.

The invention can be practiced substituting materials and processes different from those used to generate the test sheet. The invention has been described in detail with particular reference to certain preferred embodiments thereof, but it will be understood that variations and modifications can be effected within the spirit and scope of the invention.

PARTS LIST 10 display
15 display substrate
20 first conductors
30 liquid-crystal layer
31 second liquid crystal layer
35 dark infrared-blocking layer
36 infrared-reflecting domains
37 visible-reflecting domains
40 second conductors
60 incident light
60' incident light at oblique angle
62 reflected light
62' reflected light

The invention claimed is:
1. A display sheet comprising in order:
 a) an optional substrate for carrying layers of material;
 b) first transparent conductors;
 c) an imaging layer, made by coating an emulsion of domains of liquid crystal material, comprising a substantial monolayer of isolated domains of liquid-crystal material dispersed in a continuous polymer matrix, said liquid-crystal material having a first reflecting state, wherein the first reflecting state is capable of reflecting in either the visible spectral region or the infrared spectral region depending on the incident light, defining either a first or second operating spectrum and a second weakly scattering state in said corresponding first or second operating spectrum, wherein said states are capable of being interchanged by an electric field, which states are capable of being maintained as a stable state in an absence of an electric field, wherein said domains of liquid-crystal material comprises a mixture of at least two populations, a first population comprising a first liquid-crystal material having a first $\lambda_{max}$ within the infrared spectral region and a second population comprising a second liquid-crystal material having a second $\lambda_{max}$ within the visible spectral region;
 d) second conductors disposed on an opposite side of said imaging layer from said first conductors, wherein either there is an infrared-light blocking layer, between the second conductors and the imaging layer, that blocks substantially all of the infrared light transmitted through the imaging layer, or the second conductors is substantially unreflective of light in the infrared region of the spectrum.

2. The display sheet of claim 1 wherein the first liquid-crystal material has a peak reflected wavelength in the range of 710 to 1000 and said second liquid-crystal material has a peak reflected wavelength in the range of 400 to 720 nanometers.

3. The display sheet of claim 1 wherein there is a difference between said first and said second $\lambda_{max}$ of at least 50 nm.

4. The display sheet of claim 1 wherein said first and said second liquid-crystal material each comprises a dopant having a first and a second concentration, respectively, wherein said first and said second concentration differs such that the pitch of said second liquid-crystal material is smaller than the pitch of said first liquid-crystal material.

5. The display sheet of claim 1 wherein said second liquid-crystal material reflects green having $\lambda_{max}$ in a range 570 to 580nm.

6. The display sheet of claim 1 wherein said first and said second conductors are patterned to produce an addressable matrix.

7. The display sheet of claim 1 wherein said second $\lambda_{max}$ is separated by 100 to 150 nm from said first $\lambda_{max}$.

8. The display sheet of claim 1 wherein said isolated domains are flattened spheres and have on average a thickness at least 50% less than their length.

9. The display sheet of claim 8 wherein said isolated domains have a thickness to length ratio of 1:2 to 1:6.

10. The display sheet of claim 1 wherein said imaging layer has a thickness of 5 to 20 microns.

11. A display sheet comprising in order:
   a) an optional substrate for carrying layers of material;
   b) first transparent conductors;
   c) an imaging layer, made by coating an emulsion of domains of liquid crystal material, comprising a substantial monolayer of isolated domains of liquid-crystal material dispersed in a continuous polymer matrix, wherein substantial monolayer is defined to mean that, in a direction perpendicular to the plane of the display, there is no more than a single layer of domains sandwiched between the electrodes at most points of the imaging layer, said liquid-crystal material having a first reflecting state, wherein the first reflecting state is capable of reflecting in either the visible spectral region or the infrared spectral region depending on the incident light, defining either a first or second operating spectrum and a second weakly scattering state in said corresponding first or second operating spectrum, wherein said states are capable of being interchanged by an electric field, which states are capable of being maintained as a stable state in an absence of an electric field, wherein said domains of liquid-crystal material comprises a mixture of at least two populations, a first population comprising a first liquid-crystal material having a first $\lambda_{max}$ within the infrared spectral region and a second population comprising a second liquid-crystal material having a second $\lambda_{max}$ within the visible spectral region, wherein said second $\lambda_{max}$ is separated by 100 to 150 nm from said first $\lambda_{max}$;

d) second conductors disposed on an opposite side of said imaging layer from said first conductors, wherein either there is an infrared-light blocking layer, between the second conductors and the imaging layer, that blocks substantially all of the infrared light transmitted through the imaging layer, or the second conductors is substantially unreflective of light in the infrared region of the spectrum.

* * * * *